United States Patent [19]

Thiel et al.

[11] Patent Number: 4,858,728
[45] Date of Patent: Aug. 22, 1989

[54] BRAKE PAD RETENTION SPRING, IN PARTICULAR FOR SPOT-TYPE DISC BRAKES FOR AUTOMOTIVE VEHICLES

[75] Inventors: Rudolf Thiel, Frankfurt am Main; Ulrich Klimt, Muehltal, both of Fed. Rep. of Germany; Dalibor Zaviska, Frankfurt am Main, Czechoslovakia

[73] Assignee: Alfred Teves GmbH, Frankfurt am Main, Fed. Rep. of Germany

[21] Appl. No.: 230,708

[22] Filed: Aug. 5, 1988

Related U.S. Application Data

[63] Continuation of Ser. No. 9,469, Feb. 2, 1987, abandoned.

[30] Foreign Application Priority Data

Jul. 11, 1985 [DE] Fed. Rep. of Germany ....... 3532373

[51] Int. Cl.[4] ............ F16D 65/06; F16D 69/04; F16D 55/224
[52] U.S. Cl. .................. 188/73.31; 188/73.38; 188/250 G
[58] Field of Search ............ 188/73.38, 73.37, 73.36, 188/73.35, 73.33, 73.31, 73.1, 72.5, 250 G

[56] References Cited

U.S. PATENT DOCUMENTS

| | | | |
|---|---|---|---|
| 3,387,687 | 6/1968 | Eggstein et al. | 188/73.31 |
| 4,214,649 | 6/1980 | Fujimori et al. | 188/73.38 |
| 4,335,806 | 6/1982 | Lupertz | 188/73.33 |
| 4,467,897 | 8/1984 | Kubo et al. | 188/73.38 |
| 4,537,289 | 8/1985 | Von Grunberg et al. | 188/72.4 |
| 4,538,708 | 9/1985 | Seki | 188/73.38 |
| 4,609,077 | 9/1986 | Nakatsuhara | 188/73.38 |
| 4,613,018 | 9/1986 | Weiler et al. | 188/72.4 |

Primary Examiner—Andres Kashnikow
Assistant Examiner—Richard Potosnak
Attorney, Agent, or Firm—Robert P. Seitter

[57] ABSTRACT

A brake pad retention spring for spot-type disc brakes for automotive vehicles is disclosed including a fastening section for securing the spring to a brake pad backing plate and spring arms for engagement into a brake member, wherein two of the spring arms extend substantially in the circumferential direction in relation to the brake disc and a third spring arm extends substantially in the radial direction. The spring arms extending in the circumferential direction include U-shaped or V-shaped bent sections.

7 Claims, 2 Drawing Sheets

1

BRAKE PAD RETENTION SPRING, IN PARTICULAR FOR SPOT-TYPE DISC BRAKES FOR AUTOMOTIVE VEHICLES

This application is a continuation of application Ser. No. 07/009,469, filed 2/2/87, now abandoned.

BACKGROUND OF THE INVENTION

This invention relates to a brake pad retention spring and in particular for spot type disc brakes for automotive vehicles.

A retention spring of this type is disclosed in our co-pending U.S. patent application Ser. No. 889,219 filed July 25, 1986. While that retention spring generally affords a satisfactory securing of the pad, the spring arms of that spring provide less than satisfactory function and effectiveness when used in certain special applications.

SUMMARY OF THE INVENTION

It is, therefore, the object of this invention to provide for an improved brake pad retention spring particularly in respect to the function and effectiveness of the spring arms.

The spring according to the invention is substantially reduced in length in the axial direction lending to smaller space requirement in the assembly. The spring according to the invention includes two spring arms extending substantially in the circumferential direction which assist a radially acting spring arm in pressing the brake pad onto the retaining arrangement and the housing, respectively. Accordingly, radial pad replacement is possible while the housing is in its mounted position. Also, additional means to secure the brake pad in position is not required. The invention provides that, should one of the spring arms break, the pad will continue to be held captive by the remaining spring positions. The spring is also very simple to manufacture at reduced cost.

According to an advantageous feature of the invention, two legs of the spring arms form a U-shaped or V-shaped bent section which extend in a radial direction. Advantageously, this structure provides good resiliency of the spring arms in the circumferential direction.

According to another feature of the invention, the arms extending in the circumferential direction are provided with end sections which extend substantially in the circumferential direction and which are arranged on the backing plate such that their ends abut on the brake piston above the center line of the piston at a precisely defined bearing point on the brake piston. Accordingly, the radially acting spring arm is further assisted in pressing the brake pad onto the retaining arrangement and the brake housing, respectively.

According to a still further important feature of the invention, the spring arm extending substantially in the radial direction includes an end section which extends in the radial direction.

According to another aspect of the invention, all sections of the spring arms are located in planes which extend substantially vertically to the backing plate. This provides for ease of manufacture and a less costly spring.

Further, noses are provided at the end sections of the spring arms which extend in the circumferential direction, which noses form projections by which the spring engages into corresponding grooves or the like provided at the brake member.

BRIEF DESCRIPTION OF THE DRAWINGS

The invention will be described in the following Detailed Description of The Preferred Embodiment with reference to the accompanying drawings, wherein.

DETAILED DESCRIPTION OF THE PREFERRED EMBODIMENT

Figure 5:
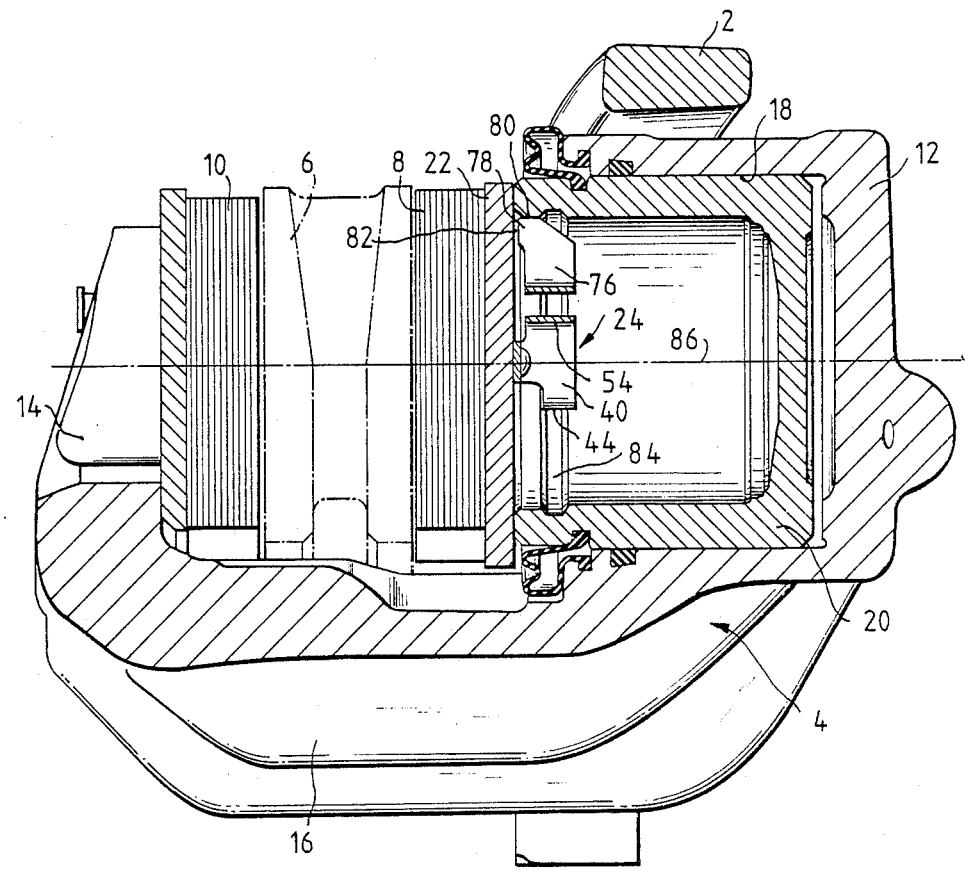
FIG. 5 shows an inwardly straddling type disc brake with an inner brake pad which is attached to the brake piston by means of the retention spring according to the invention.

The inwardly straddling disc brake illustrated in FIG. 5 includes a brake carrier 2 rigidly mounted to a vehicle, not shown, and a brake housing 4 axially slidably supported on the brake carrier 2. The brake housing embraces the inner edge of a brake disc 6 (shown in outline form) and two brake pads 8, 10 are arranged on either side of the brake disc 6. The brake housing 4 is of substantially U-shaped configuration having two radially extending legs 12, 14 which are interconnected through a substantially axially extending bridge section 16. In the inward leg 12, an actuating device is arranged which includes a piston 20 slidable in a cylinder bore 18 and abutting with its open side on the backing plate 22 of the brake pad 8. The brake pad 8 is secured to the piston 20 by a retention spring 24, which is the subject of the invention and is described below.

The brake pad 8, with retention spring 24, is illustrated in detail in FIGS. 1 to 4. Referring to FIGS. 1–4, the retention spring 24 includes a sustantially rectangular fastening section 26 including two through holes 28, 30 by way of which the retention spring 24 is secured to the backing plate by the rivets 32, 34. Other fastening methods such as caulking or spot-welding or the like may also be applied.

Extending from the sides of the fastening section 26 are two spring arms 40, 42 integrally formed with the fastening section 26. The spring arms 40, 42 have U-shaped sections 44, 46 with the open side of the U facing upwards as viewed in the drawing. Succeeding the sections 44, 46 are end sections 48, 50 which extend in the circumferential direction and whose ends, in the mounted condition, are disposed above the horizontal center line of the piston 20. Provided at the end section 48, 50 are noses 52, 54 which are directed toward the backing plate 22. The end sections likewise form projections 56, 58 which extend in the circumferential direction of the disc and pad and which, in the mounted condition, engage into corresponding indentations in the associated brake member, that is in the brake piston 20 in the instant case. For this purpose, transversely extending abutment surfaces 60, 62 are provided at the projections 56, 58. The abutment surfaces take support in the annular groove 84 in the piston 20 and thus draw the brake pad 8 axially to the piston.

Figure 1:
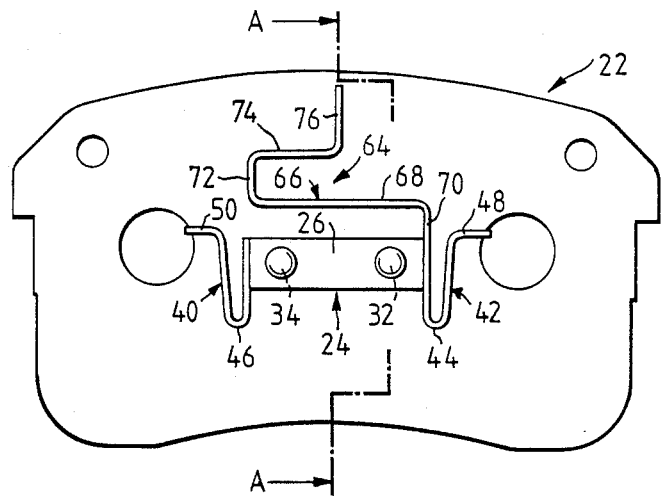
FIG. 1 is a view of the rear side of a brake pad provided with a retention spring according to the invention.
Figure 2:
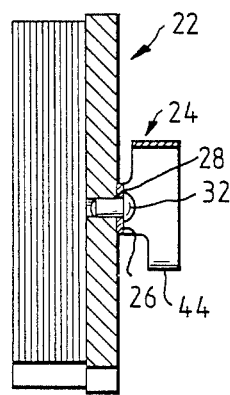
FIG. 2 is a sectional view of the pad of FIG. 1, taken along the line A—A of FIG. 1 showing details of the spring.
Figure 3:
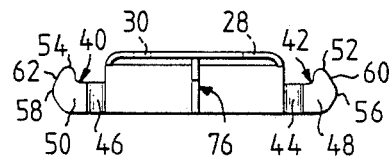
FIG. 3 is a plan view of the retention spring, showing details of construction.
Figure 4:
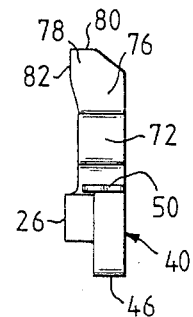
FIG. 4 is a side view of the retention spring showing further details of construction.

The spring arm 42, which is on the right side in the drawings, passes into a substantially radially extending spring arm 64 having an S-shaped section 66 whose mid-portion 68 extends substantially in the circumferential direction and whose legs 70, 72 adjacent thereto extend substantially radially relative to the disc and pad. Adjoining the leg 72 is a section 74 which extends in parallel to the mid-portion 68 up to roughly the middle thereof and which then passes into an end section 76 that is disposed on the center line of the pad and extends radially. As shown in FIG. 4, the end section 76 forms an axially protruding nose 78 having abutment surfaces 80, 82 for engaging against the pad and the inner piston wall, respectively.

As shown in FIG. 5, the nose 78 of the end section 76 bears with the bearing surface 80 against the inner wall of the brake piston 20. The nose 78 bears against the backing plate only during assembly. In the operating condition, a play of about 0.5 to 1 mm is desired. The noses 52, 54 of the spring arms 40, 42 engage into an annular groove 84 provided at the inner surface of the piston. Because the noses are arranged above the center line 86 of the piston, a force is exerted by the piston inner wall onto the noses which urges the retention spring 24 and hence the brake pad 8 towards the brake disc axis. The frictional resistance in the direction of force of the spring arm 64 can thereby be precluded.

We claim:

1. A brake pad retention spring for a spot-type disc brake for automotive vehicles, said disc brake including a brake piston acting upon a pad backing plate, said spring comprising a fastening section for securing said spring to said pad backing plate, a plurality of spring arms for engagement into a brake member, wherein two of said spring arms extend substantially in a circumferential direction in relation to a brake disc and a third of said spring arms extends substantially in a radial direction in relation to said brake disc, said two spring arms each having a nose protruding from the end of a circumferentially extending end section of each of the spring arms of the spring arms, said noses each extending into an annular groove means extending circumferentially along an inner surface of said brake piston, each of said two spring arms extending in the circumferential direction include a generally U-shaped bent section, wherein said arms are each arranged at the pad backing plate such that a free end of the end section abuts on said brake piston above a center line of said piston.

2. A retention spring as claimed in claim 1 wherein the spring arm extending substantially in the radial direction has an end section extending in the radial direction, including a nose said end section protruding in an axial direction.

3. A retention spring as claimed in claim 1 wherein said noses protrude in an axial direction.

4. A retention spring as claimed in claim 2 wherein said nose on said end section bears with a bearing surface against an inner wall of said brake piston.

5. A retention spring as claimed in claim 3 wherein said noses extending into said annular groove contact said annular groove above a center line of said piston to provide a force which urges said retention spring and said brake pad towards an axis of said brake disc.

6. A retention spring as claimed in claim 1 wherein said noses which protrude from the free ends of said circumferentially extending spring arms include an abutment surface for engaging said annular groove means, said abutment surface having a substantially rounded end.

7. A brake pad retention spring for a spot-type disc brake for automotive vehicles, said disc brake including a brake piston acting upon a pad backing plate, said spring comprising a fastening section for securing said spring to said pad backing plate, a plurality of spring arms for engagement into a brake member, wherein two of said spring arms extend substantially in a circumferential direction in relation to a brake disc and a third of said spring arms extends substantially in a radial direction in relation to said brake disc, said two spring arms each having a nose protruding from the end of a circumferentially extending end section of each of the spring arms of the spring arms, said noses each extending into an annular groove means extending circumferentially along an inner surface of said brake piston, each of said two spring arms extending in the circumferential direction include a generally V-shaped bent section, wherein said arms are each arranged at the pad backing plate such that a free end of the end section abuts on said brake piston above a center line of said piston.

* * * * *